(12) United States Patent
Mao

(10) Patent No.: US 12,223,326 B2
(45) Date of Patent: Feb. 11, 2025

(54) ORDER-PRESERVING METHOD AND SYSTEM FOR MULTIPLE SETS OF LOAD STORE QUEUES OF PROCESSOR AND RELATED DEVICE

(71) Applicant: Rivai Technologies (Shenzhen) Co., Ltd., Shenzhen (CN)

(72) Inventor: Xiangyu Mao, Shenzhen (CN)

(73) Assignee: Rivai Technologies (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 18/693,524

(22) PCT Filed: Nov. 20, 2023

(86) PCT No.: PCT/CN2023/132628
§ 371 (c)(1),
(2) Date: Mar. 20, 2024

(87) PCT Pub. No.: WO2024/259888
PCT Pub. Date: Dec. 26, 2024

(65) Prior Publication Data
US 2024/0427603 A1 Dec. 26, 2024

(30) Foreign Application Priority Data
Jun. 21, 2023 (CN) .......................... 202310740730.4

(51) Int. Cl.
*G06F 9/38* (2018.01)
*G06F 9/30* (2018.01)
(52) U.S. Cl.
CPC ........ *G06F 9/3856* (2023.08); *G06F 9/30038* (2023.08); *G06F 9/30043* (2013.01)
(58) Field of Classification Search
CPC ............. G06F 9/30018; G06F 9/30036; G06F 9/30038; G06F 9/30043; G06F 9/30076;
(Continued)

(56) References Cited

U.S. PATENT DOCUMENTS 10,963,402 B1 * 3/2021 Donley ............... G06F 13/1642
2008/0320016 A1 12/2008 Singh et al.
(Continued)

FOREIGN PATENT DOCUMENTS

| CN | 101021782 A | 8/2007 |
| CN | 112099854 A | 12/2020 |

(Continued)

OTHER PUBLICATIONS

First Office Action from CN Application No. 202310740730.4 dated Jul. 29, 2023.
(Continued)

*Primary Examiner* — Andrew Caldwell
*Assistant Examiner* — Kasim Alli
(74) *Attorney, Agent, or Firm* — Daylight Law, P.C.

(57) ABSTRACT

An order-preserving method and system for multiple sets of load store queues of a processor and a related device are disclosed. The order-preserving method includes the following steps of: presetting a total depth of the queues; wherein the total depth of the queues comprises multiple sets of sub-queues; determining a dimension of an age matrix according to the total depth of the queues; initializing the age matrix to obtain initial age information of the age matrix; wherein the initial age information comprises entries of the sub-queues; when a preset instruction is received and enters the total depth of the queues, updating related positions of corresponding rows and columns in the age matrix according to a time order, and recording age information; and initiating a request through the multiple sets of sub-queues, and searching for local and global age information for order-preserving operation.

6 Claims, 3 Drawing Sheets

(58) Field of Classification Search
CPC .. G06F 9/30079; G06F 9/3834; G06F 9/3836; G06F 9/3838; G06F 9/3856
See application file for complete search history.

(56) References Cited

U.S. PATENT DOCUMENTS

| | | |
|---|---|---|
| 2009/0019272 A1 | 1/2009 | Cypher et al. |
| 2011/0185159 A1 | 7/2011 | Bishop et al. |
| 2017/0168824 A1 | 6/2017 | Bonanno et al. |
| 2019/0391815 A1 | 12/2019 | Mcglone et al. |
| 2021/0049018 A1 | 2/2021 | Silberman |
| 2024/0004657 A1* | 1/2024 | Arunachalam ....... G06F 9/3836 |
| 2024/0311186 A1* | 9/2024 | Shin ...................... G06F 9/4881 |

FOREIGN PATENT DOCUMENTS

| | | |
|---|---|---|
| CN | 213482862 U | 6/2021 |
| CN | 114930284 A | 8/2022 |
| WO | 2021134050 A | 7/2021 |

OTHER PUBLICATIONS

Search Report from CN Application No. 202310740730.4 dated Jul. 27, 2023.
Supplemental Search Report from CN Application No. 202310740730.4 dated Aug. 4, 2023.

* cited by examiner

ORDER-PRESERVING METHOD AND SYSTEM FOR MULTIPLE SETS OF LOAD STORE QUEUES OF PROCESSOR AND RELATED DEVICE

CROSS-REFERENCE TO RELATED APPLICATIONS

This application is a national stage filing under 35 U.S.C. § 371 of international application number PCT/CN2023/132628, filed Nov. 20, 2023, which claims priority to Chinese patent application No. 202310740730.4 filed Jun. 21, 2023. The contents of these applications are incorporated herein by reference in their entirety.

TECHNICAL FIELD

The present disclosure relates to the technical field of processor architectures, and particularly to an order-preserving method and system for multiple sets of load store queues of a processor, a computer device and a computer readable storage medium.

BACKGROUND

With the rapid development of semiconductors, processors have been widely used in all aspects of people's lives. Personal electronic devices such as wearable devices and mobile phones, as well as high-performance computing devices such as computers and servers, depend on the computing and data processing capabilities of the processors. Modern high-performance processors have extremely high data operation and processing capabilities, and accordingly, there exists higher requirements for data storage and access performance. An operation in the processor can only begin after the corresponding data to be operated is accessed from a memory. After the operation is completed, a result still needs to be stored back in the memory for subsequent use. The memory access of the processor forms a bottleneck in a computer system due to the following reasons: 1. memory bandwidth restriction; 2. memory delay; 3. cache miss; and 4. memory access conflict.

At present, in order to improve the performances of the processor, a series of measures need to be taken to optimize the memory access, such as increasing a load store queue, increasing a memory bandwidth, reducing a memory delay, optimizing a cache algorithm, and avoiding memory access conflicts. Load store queue has been widely used between the processor and the cache. The load store queue is a kind of cache in the processor, which is used to store access and storage instructions to be executed, as well as data and addresses needed by the instructions. The load store queue can reduce a number of memory accesses of the processor and improve the efficiency of instruction execution. The load store queue comprises load queue and store queue, and a micro-architecture thereof usually comprises a load queue, a store queue, a data cache, an address calculation unit and a memory access unit. According to an execution order between access and storage requests, the load store queue usually has the several structures as follows: 1. integrated queue: all requests will be stored in the same First Input First Output (FIFO) queue; then the requests will be subsequently sent from the queue to the cache or memory in the initial order; since all the requests enter and leave the queue according to the program order, there is no need for additional inspection and operation; 2. dissociated queue: one of the most common load store queue structures, which temporarily stores load requests and store requests into two queues respectively; however, because the load requests and store requests are in different queues, it is necessary to check age of instructions mutually to ensure the sequential execution of instructions that may violate memory consistency; 3. multiple sets of sub-queues: in a high-performance processor, as a queue depth increases, the time required for searching in the queue increases; in order to meet timing requirements of processing a main frequency, the queue is divided into multiple sets of sub-queues by difference. In this case, in order to ensure the instruction order, each sub-queue needs to access the rest sub-queues to check the age and address.

Logic and hardware implementation of age query for the integrated queue and the common dissociated queue are simple, however due to the small number of queues and the large depth of a single queue, the integrated queue and the common dissociated queue are difficult to meet the time order requirements at high frequency in designs with large requirements for total depth of the queue (such as high-performance processor). Although the multiple sets of queues can meet the time order requirements, the logic is complicated and it is difficult to know the global order of all requests in different sub-queues because each set of sub-queues needs to request an age query, therefore the realizability and performance of the multiple sets of queues are poor.

SUMMARY

The embodiments of the present disclosure aim at providing an order-preserving method for the multiple sets of load store queues of the processor to solve problems that the existing multiple sets of load store queues of the processor are troublesome in age query, complex in order-preserving, and poor in realizability and performance.

In order to solve the technical problems above, in accordance with a first aspect of the present disclosure, an embodiment provides an order-preserving method for the multiple sets of load store queues of the processor, which includes the following steps of:

presetting a total depth of the queues; wherein the total depth of the queues includes multiple sets of sub-queues;

determining a dimension of an age matrix according to the total depth of the queues;

initializing the age matrix to obtain initial age information of the age matrix; wherein the initial age information includes entries of the sub-queues;

updating related positions of corresponding rows and columns in the age matrix according to a time order and recording an age information, in response to a preset instruction being received and entering the total depth of the queues; and initiating a request through the multiple sets of sub-queues, and searching for local and global age information for order-preserving operation. Preferably, the step of initializing the age matrix to obtain the initial age information of the age matrix specifically includes:

initializing and/or clearing the age information in the age matrix in response to the age matrix being initialized or flushed by a processor pipeline.

Preferably, initializing the age matrix specifically includes the following sub-steps of:

acquiring a size of the age matrix according to the total depth of the queues;

dividing the age matrix according to a number of the multiple sets of sub-queues;

initializing the age matrix; and obtaining a queue of the age matrix.

Preferably, the step of updating the related positions of the corresponding rows and columns in the age matrix according to the time order and recording the age information, in response to a preset instruction being received and entering the total depth of the queues, specifically includes the following sub-steps:

receiving the preset instruction and sending a request updating information;

determining whether the processor pipeline flushes the age matrix;

in response to the processor pipeline flushing the age matrix, resetting the age matrix;

in response to the processor pipeline not flushing the age matrix, recording the age information;

setting the corresponding rows according to the age information; and setting the corresponding columns according to the setting of the corresponding rows.

Preferably, the step of initiating a request through the multiple sets of sub-queues, and searching for local and global age information for order-preserving operation, specifically includes the following sub-steps:

receiving a request to be queried, and generating a selection vector according to a range of the request to be queried;

generating a selection mask according to a query type; in response to an oldest request being selected, columns corresponding to the unselected request are all set to 0; and in response to a youngest request being selected, columns corresponding to the selected request are all set to 0; wherein 0 is an assignment;

generating a result matrix according to the selection mask; and generating a result vector according to the result matrix.

Preferably, generating the result matrix according to the selection mask, specifically includes the following sub-steps of:

generating a sub-result matrix according to elements corresponding to the sub-queues in response to selecting in the sub-queues.

Preferably, after the step of initiating a request through the multiple sets of sub-queues, and searching for local and global age information for order-preserving operation, the method further includes the following steps:

in response to the request being completed and released from the total depth of the queues, updating the related positions of the corresponding rows and columns in the age matrix, and deleting the age information.

In accordance with a second aspect of the present disclosure, an embodiment provides an order-preserving system for multiple sets of load store queues of a processor, wherein the order-preserving system includes:

a preset module configured to preset a total depth of queues; wherein the total depth of the queues includes multiple sets of sub-queues;

a determination module configured to determine a dimension of an age matrix according to the total depth of the queues;

an initialization module configured to initialize the age matrix to obtain initial age information of the age matrix; wherein the initial age information includes entries of the sub-queues;

an updating module configured to update related positions of corresponding rows and columns in the age matrix according to a time order and to record age information, in response to a preset instruction being received and entering the total depth of the queues; and a searching module configured to initiate a request through the multiple sets of sub-queues, and searching for local and global age information for order-preserving operation.

In accordance with a third aspect of the present disclosure, an embodiment provides a computer device, wherein the computer device includes a memory, a processor, and an order-preserving program for multiple sets of load store queues of a processor stored in the memory and executed by the processor, when the order preserving program for the multiple sets of memory access queues of the processor is executed, the processor performs the steps of the order-preserving method for the multiple sets of load store queues of the processor as described above.

In accordance with a fourth aspect of the present disclosure, an embodiment provides a computer readable storage medium storing an order-preserving program for multiple sets of load store queues of a processor, when executed by the processor, causes the processor to perform the steps of the order-preserving method for the multiple sets of load store queues of the processor as described above.

Compared with the existing technology, according to the order-preserving method for the multiple sets of load store queues of the processor in the present disclosure, the total depth of the queues is preset; wherein the total depth of the queues includes multiple sets of sub-queues; the dimension of the age matrix is determined according to the total depth of the queues; the age matrix is initialized to obtain the initial age information of the age matrix; when the preset instruction is received and enters the total depth of the queues, the related positions of the corresponding rows and columns in the age matrix are updated according to the time order, and the age information is recorded; the request is initiated through the multiple sets of sub-queues, and local and global age information is searched for the order-preserving operation; and when the request is completed and released from the total depth of the queues, the related positions of the corresponding rows and columns in the age matrix are updated, and the age information is deleted. In this way, the age query within the sub-queues and the global age query are provided for the order-preserving operation, which reduces the logic and delay of mutual query between the sub-queues, and reduces the difficulty of time order convergence under a high processor frequency. Meanwhile, benefitting by the structure of the age matrix, a small time increment required for the searching operation can be achieved under the design requirements of multiple sub-queues and large depth of the queues, which is more suitable for the requirements of high-performance processors than traditional searching. Finally, the method can be subdivided into sub-queue searching or global searching, and does not affect the maintenance and query of global information. By uniformly maintaining the age sequence of recorded instructions, local and global age queries between instructions are provided, which can meet the high-frequency time order and reduce the complexity of order-preserving among the multiple sets of load store queues, thereby ensuring the realizability and performances under the large-depth queue design.

BRIEF DESCRIPTION OF THE DRAWINGS

In order to illustrate the technical solutions in the embodiments of the present disclosure or in the related art more clearly, the drawings used in the description of the embodiments or the existing technology will be briefly described below. Obviously, the drawings in the following description are merely some embodiments of the present disclosure. For those of ordinary skills in the art, other drawings can also be obtained based on these drawings without going through any creative work, wherein.

DETAILED DESCRIPTION

Figure 1:
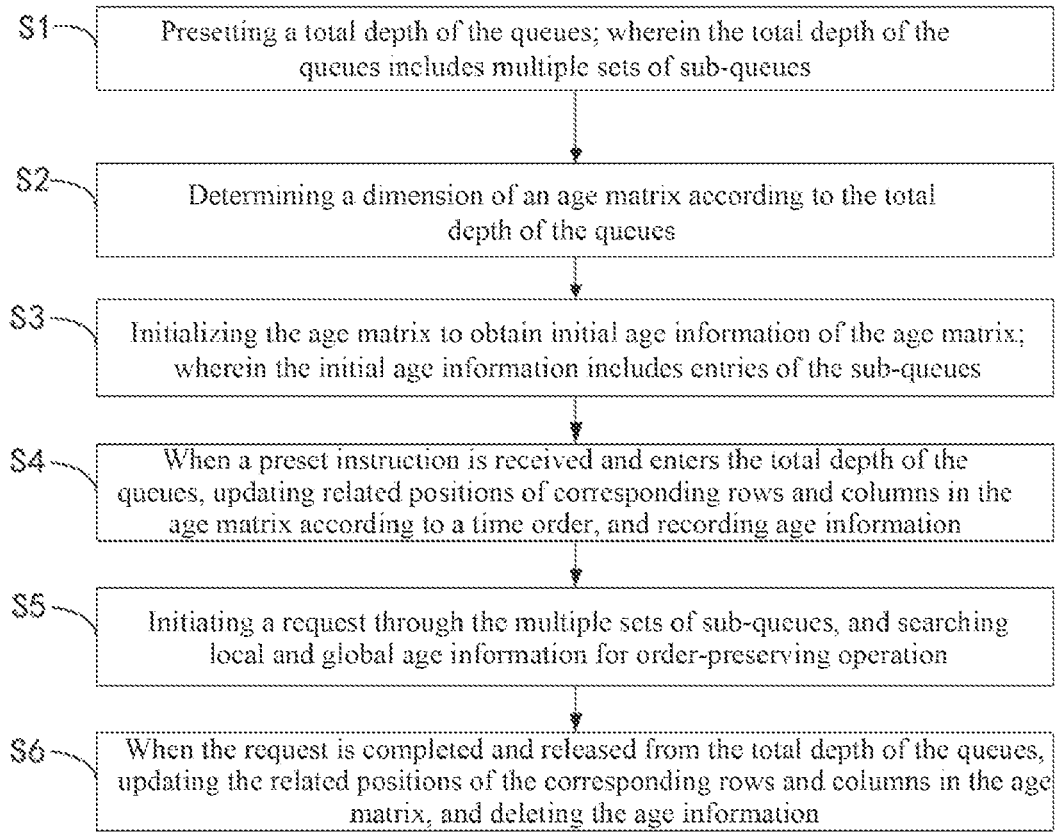
FIG. 1 is a flowchart of an order-preserving method for the multiple sets of load store queues of the processor provided by an embodiment of the present disclosure.
Figure 2:
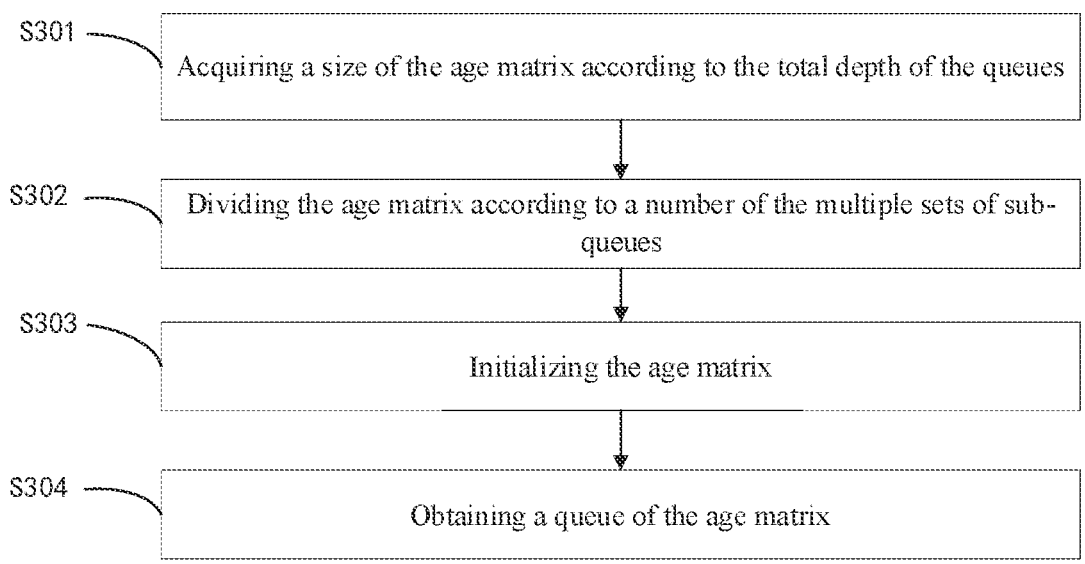
FIG. 2 is a specific flowchart of step S3 provided by an embodiment of the present disclosure.
Figure 3:
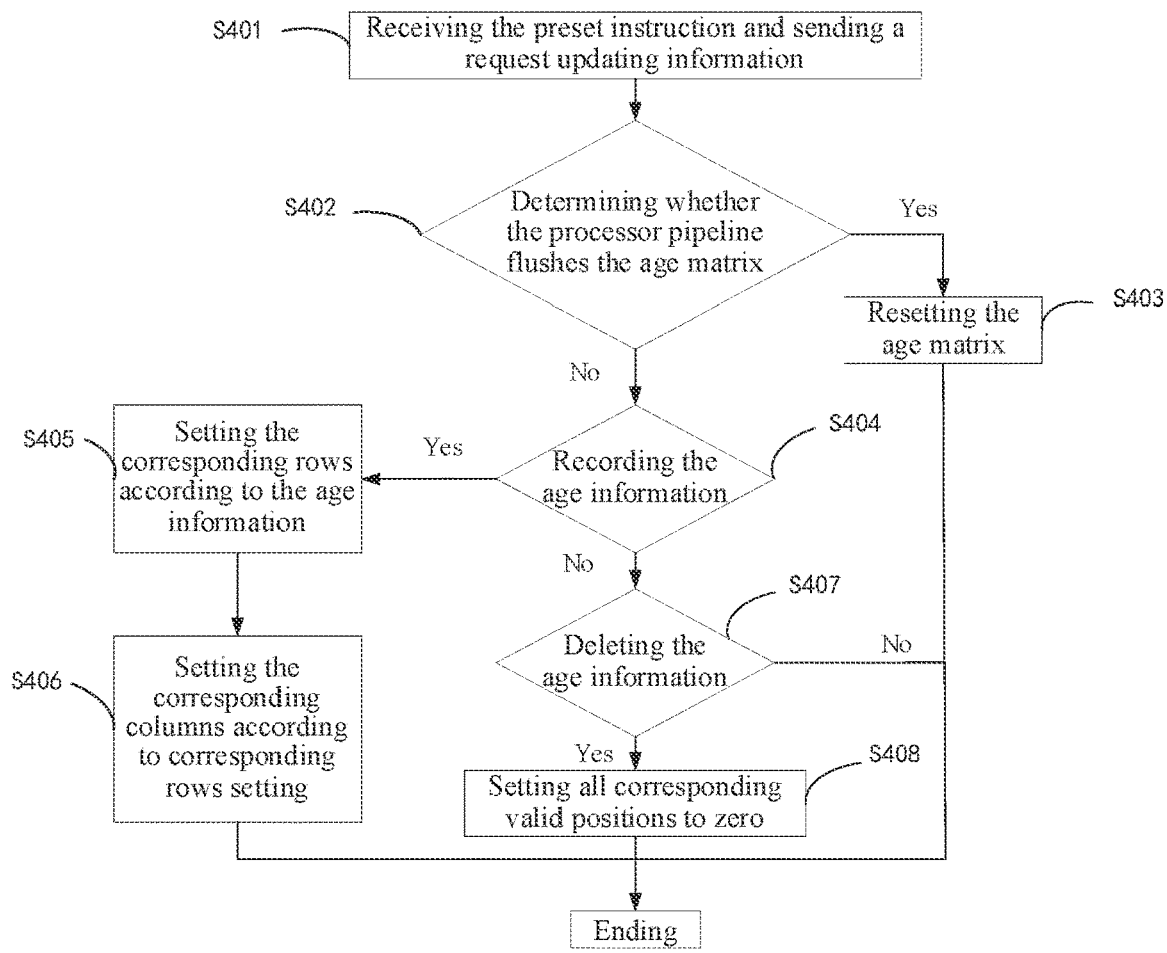
FIG. 3 is a specific flowchart of step S4 provided by an embodiment of the present disclosure.
Figure 4:
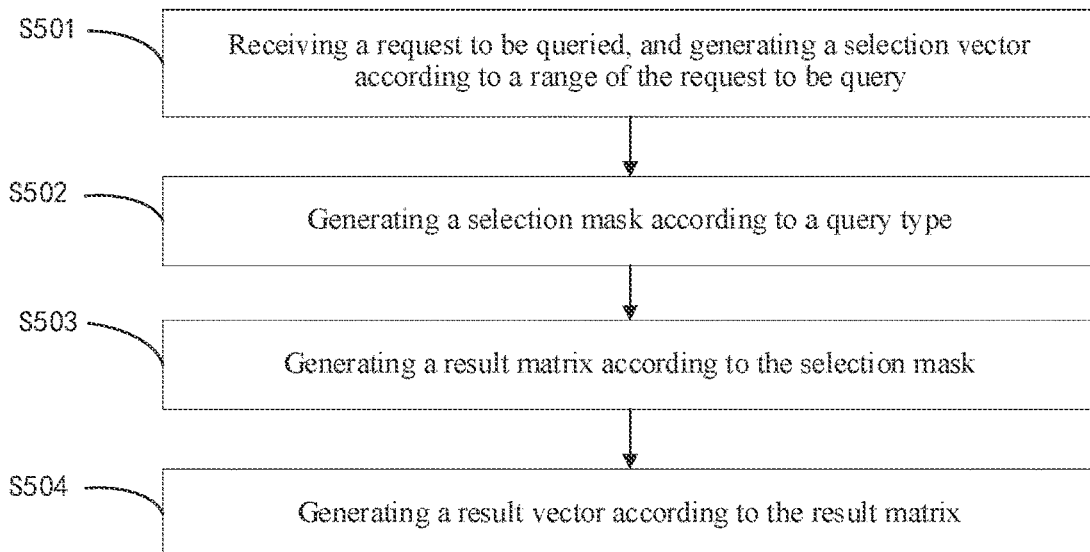
FIG. 4 is a specific flowchart of step S5 provided by an embodiment of the present disclosure.

The following clearly and completely describes the technical solutions of the present disclosure with reference to the embodiments. Apparently, the described embodiments are merely some but not all of the embodiments of the present disclosure. Based on the embodiments of the present disclosure, all other embodiments obtained by those having ordinary skills in the art without going through any creative work shall fall within the scope of protection of the present disclosure.

Embodiment 1

Referring to FIG. 1 to FIG. 4, the embodiment of the present disclosure provides an order-preserving method for the multiple sets of load store queues of the processor, which includes the following steps.

Step S1: presetting a total depth of the queues; wherein the total depth of the queues includes multiple sets of sub-queues.

Specifically, the preset total depth of the queues can be a total depth of the queues accessed by a processor, where the number of processors can be one or more, and the total depth of the queues includes multiple sets of sub-queues, and the processor can load and store the multiple sets of sub-queues.

Step S2: determining a dimension of an age matrix according to the total depth of the queues.

The age matrix is used for recording relative ages between entries. Entries with N*N bits are used to store the age information; and N=number of entries. The matrix is updated whenever entries are allocated and deallocated. The corresponding bit will be set or cleared.

Specifically, the dimension of the age matrix may be a calculation amount of the age matrix, for example, two-dimensional, three-dimensional and four-dimensional, etc., by reducing the dimension of the age matrix, the calculated amount of the age matrix can be reduced and a calculation efficiency of the age matrix can be improved.

Step S3: initializing the age matrix to obtain initial age information of the age matrix. The initial age information includes entries of the sub-queues.

The initial age information is obtained by initializing the age matrix and clearing the data in the age matrix. For example, the initial age information may be a table, and there is age data in the table. The age data is cleared, which is convenient for generating new age information.

Step S4: when a preset instruction is received and enters the total depth of the queues, updating related positions of corresponding rows and columns in the age matrix according to a time order, and recording age information.

The preset instructions may be load requests of external output and storage requests. After receiving the preset instructions, the multiple sets of sub-queues update the related positions in the age matrix in a time order and record the corresponding age information. The related positions may be corresponding row and column positions of the age matrix, and the like.

The age information is the currently updated age information, which contains the rows and columns of the age matrix, and multiple numerical values are set on the rows and columns.

Optionally, when receiving the preset instruction and entering the queue, the related positions in the age matrix can be updated in a size order, a logical order and a spatial order, and the age information can be recorded.

Step S5: initiating a request through the multiple sets of sub-queues, and searching for local and global age information for order-preserving operation.

Step S6: when the request is completed and released from the total depth of the queues, updating the related positions of the corresponding rows and columns in the age matrix, and deleting the age information.

Specifically, the total depth of the queues is preset; wherein the total depth of the queues includes multiple sets of sub-queues; the dimension of the age matrix is determined according to the total depth of the queues; the age matrix is initialized to obtain the initial age information of the age matrix; when the preset instruction is received and enters the total depth of the queues, the related positions of the corresponding rows and columns in the age matrix are updated according to the time order, and the age information is recorded; the request is initiated through the multiple sets of sub-queues, and local and global age information is searched for the order-preserving operation; and when the request is completed and released from the total depth of the queues, the related positions of the corresponding rows and columns in the age matrix are updated, and the age information is deleted. In this way, the age query within the sub-queues and the global age query are provided for the order-preserving operation, which reduces the logic and delay of mutual query between the sub-queues, and reduces the difficulty of time order convergence under a high processor frequency. Meanwhile, benefitting by the structure of the age matrix, a small time increment required for the searching operation can be achieved under the design requirements of multiple sub-queues and large depth of the queues, which is more suitable for the requirements of high-performance processors than traditional searching. Finally, the method can be subdivided into sub-queue or global searching, and does not affect the maintenance and query of global information. By uniformly maintaining the age sequence of recorded instructions, local and global age queries between instructions are provided, which can meet the high-frequency time order and reduce the complexity of order-preserving among the multiple sets of load store queues, thus ensuring the realizability and performances under the large-depth queue design.

In the embodiment, the step S3 specifically includes the following sub-steps of:

initializing and/or clearing the age information in the age matrix when the age matrix is initialized or flushed by a processor pipeline. An initializing stage of the age matrix is mainly responsible for determining the required size and division of the matrix, and initializing the matrix to prepare for recording the age information of the instruction.

In the embodiment, in the step S3, initializing the age matrix specifically includes the following sub-steps of:

Step S301: acquiring a size of the age matrix according to the total depth of the queues.

Step S302: dividing the age matrix according to a number of the multiple sets of sub-queues.

Step S303: initializing the age matrix.

Step S304: obtaining a queue of the age matrix.

The size of the age matrix is: the total depth of the queues multiplied by the total depth of the queues, and each entry is a single bit. When there are multiple sets of sub-queues, the sub-queues correspond to the entries in the age matrix from low to high. For example, in a load store queue with a total depth of 32 and divided into four sub-queues, a 32×32 two-dimensional single-bit matrix is needed. Entries 1 to 8 correspond to the first sub-queue, and entries 24 to 32 correspond to the last sub-queue. After that, all the entries need to be initialized to 0.

Specifically, at the beginning, the matrix size of the age matrix is obtained according to the total depth of the queues, the age matrix is divided, and the divided age matrix is initialized to obtain the queues of the age matrix, and then the initializing process of the age matrix is ended.

In the embodiment, the step S4 specifically includes the following sub-steps of:

Step S401: receiving the preset instruction and sending a request updating information.

Step S402: determining whether the processor pipeline flushes the age matrix.

Step S403: if yes, resetting the age matrix.

Step S404: if not, recording the age information.

Step S405: setting the corresponding rows according to the age information.

Step S406: setting the corresponding columns according to the setting of the corresponding rows.

In the embodiment, the order-preserving method further includes the following sub-steps of:

Step S407: when the age information is recorded, deleting the age information.

Step S408: setting all corresponding valid positions to zero.

The age matrix determines the relative age between requests through 0/1 of the row and column where each element is located. When the content of the element of row N-column M is 0, it means that the age of request N is smaller than the age of request M, and when it is 1, it means that the age of request N is larger than the age of request M. When M=N, the corresponding element is used to indicate a valid status, when the content of the above corresponding element is 1, the request N is valid, and when the content of the above corresponding element is 0, the request N is invalid.

When the age matrix is flushed through the processor pipeline, all elements in the matrix are set to zero.

Recording the age of the request, and updating according to the position in the queue corresponding to the instruction, including the following two steps: 1. setting all the elements in the corresponding row to 0, which means that the request is younger than all other existing instructions. 2. Setting all the elements in the corresponding column to 1 (including valid bits), which means that other existing instructions are larger than the current instruction. Of course, the above two steps can also be executed simultaneously.

Deleting request age: setting a valid bit corresponding to the element to 0.

Specifically, at the beginning, it is determined whether the processor pipeline flushes the age matrix by receiving the preset instruction and sending the request updating information; if yes, the age matrix is reset, and all the elements of the age matrix are reset to zero, and then the process is ended. If not flushing, it is determined whether to record the age information of the age matrix; if yes, the row corresponding to the age information is set to 0, and the row is correspondingly set to 1 according to the row setting, and the process is ended. If not, the age information is deleted and the corresponding valid position is set to 0.

In the embodiment, the step S5 specifically includes the following sub-steps of:

Step S501: receiving a request to be queried, and generating a selection vector according to a range of the request to be queried.

Generating the selection vector is to generate a vector according to the range of the request to be queried, for example, 1 indicates selected, and 0 indicates unselected. For example, in a queue with a depth of 4, a vector required to select the $2^{nd}$ and $4^{th}$ requests is: 4'b1010.

Step S502: generating a selection mask according to a query type; wherein when the oldest request is selected, columns corresponding to the unselected request are all set to 0; and when the youngest request is selected, columns corresponding to the selected request are all set to 0. 0 is an assignment.

Generating the selection mask is to generate a mask according to the query type (youngest/oldest). When the oldest request is selected, columns corresponding to the unselected request are all set to 0. When the youngest request is selected, columns corresponding to the selected request are all set to 0.

Step S503: generating a result matrix according to the selection mask.

The information in the age matrix is processed and placed in a temporary result matrix according to the information of the selection mask to realize the generation of the result matrix.

Step S504: generating a result vector according to the result matrix.

Generating a result vector according to the result matrix. When the oldest is selected, a row with all 1 in the result matrix indicates that the element is the oldest among the selected elements. For example, if the $N^{th}$ row is all 1, then the $N^{th}$ element is the oldest, wherein N represents the number. When the youngest is selected, a row with all 0 in the result matrix indicates that the element is the youngest among the selected elements.

In the embodiment, the step S503 specifically includes the following sub-step of: generating a sub-result matrix according to elements corresponding to the sub-queues when selecting in the sub-queues.

Specifically, when it is only required to select in the sub-queues, it is only required to generate the sub-result matrix according to the elements corresponding to the sub-queues. For example, in a four-set sub-queue structure with a total depth of 16, when only the age information of the first sub-queue needs to be queried, only a 4×4 result matrix needs to be generated instead of a 16×16 global matrix.

Embodiment 2

Figure 5:
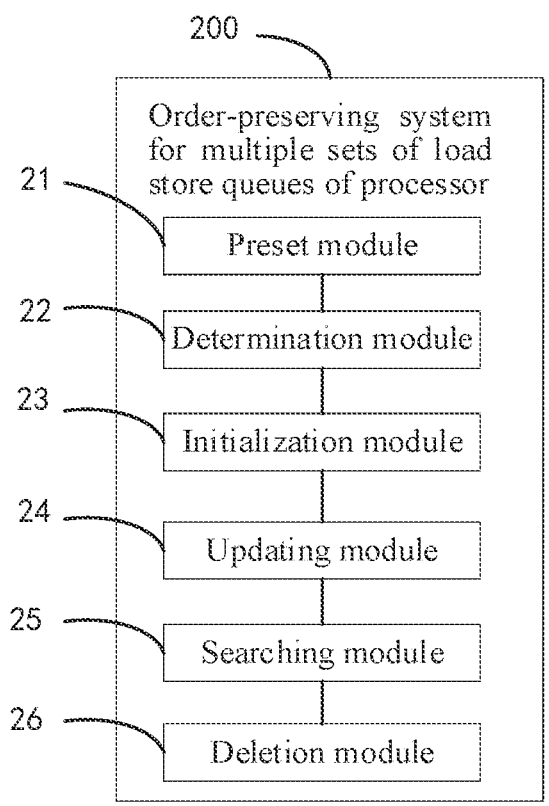
FIG. 5 is a module diagram of an order-preserving system for multiple sets of load store queues of a processor provided by an embodiment of the present disclosure.

As shown in FIG. 5, the embodiment of the present disclosure provides an order-preserving system 200 for multiple sets of load store queues of a processor, wherein the order-preserving system 200 includes:

a preset module 21 configured to preset a total depth of queues; wherein the total depth of the queues includes multiple sets of sub-queues;

a determination module 22 configured to determine a dimension of an age matrix according to the total depth of the queues;

an initialization module 23 configured to initialize the age matrix to obtain initial age information of the age matrix; wherein the initial age information includes entries of the sub-queues;

an updating module 24 configured to update related positions of corresponding rows and columns in the age matrix according to a time order and to record age information, in response to a preset instruction being received and entering the total depth of the queues;

a searching module 25 configured to initiate a request through the multiple sets of sub-queues, and search for local and global age information for order-preserving operation.

a deletion module 26 configured to update the related positions of the corresponding rows and columns in the age matrix and to delete the age information, when the request is completed and released from the total depth of the queues. In this way, the age query within the sub-queues and the global age query are provided for the order-preserving operation, which reduces the logic and delay of mutual query between the sub-queues, and reduces the difficulty of time order convergence under a high processor frequency. Meanwhile, benefitting by the structure of the age matrix, a small time increment required for the searching operation can be achieved under the design requirements of multiple sub-queues and large depth of the queues, which is more suitable for the requirements of high-performance processors than traditional searching. Finally, the method can be subdivided into sub-queue or global searching, and does not affect the maintenance and query of global information. By uniformly maintaining the age sequence of recorded instructions, local and global age queries between instructions are provided, which can meet the high-frequency time order and reduce the complexity of order-preserving among the multiple sets of load store queues, thus ensuring the realizability and performances under the large-depth queue design.

In the embodiment, the initialization module 23 is also configured to initialize and/or clear the age information in the age matrix when the age matrix is initialized or flushed by a processor pipeline. An initializing stage of the age matrix is mainly responsible for determining the required size and division of the matrix, and initializing the matrix to prepare for recording the age information of the instruction.

In the embodiment, the initialization module 23 is also configured to acquire a size of the age matrix according to the total depth of the queues; and divide the age matrix according to a number of the multiple sets of sub-queues; and obtain a queue of the age matrix.

The size of the age matrix is: the total depth of the queues multiplied by the total depth of the queues, and each entry is a single bit. When there are multiple sets of sub-queues, the sub-queues correspond to the entries in the age matrix from low to high. For example, in a load store queue with a total depth of 32 and divided into four sub-queues, a 32×32 two-dimensional single-bit matrix is needed. Entries 1 to 8 correspond to the first sub-queue, and entries 24 to 32 correspond to the last sub-queue. After that, all the entries need to be initialized to 0.

Specifically, at the beginning, the matrix size of the age matrix is obtained according to the total depth of the queues, the age matrix is divided, and the divided age matrix is initialized to obtain the queues of the age matrix, and then the initializing process of the age matrix is ended.

In the embodiment, the updating module 24 is also configured to receive the preset instruction and sending a request updating information; determining whether the processor pipeline flushes the age matrix; if yes, resetting the age matrix; if not, recording the age information; setting the corresponding rows according to the age information; setting the corresponding columns according to the setting of the corresponding rows; when the age information is recorded, deleting the age information; and setting all corresponding valid positions to zero.

The age matrix determines the relative age between requests through 0/1 of the row and column where each element is located. When the content of the element of row N-column M is 0, it means that the age of request N is smaller than the age of request M, and when it is 1, it means that the age of request N is larger than the age of request M. When M=N, the corresponding element is used to indicate a valid status, when the content of the above corresponding element is 1, the request N is valid, and when the content of the above corresponding element is 0, the request N is invalid.

When the age matrix is flushed through the processor pipeline, all elements in the matrix are set to zero.

Recording the age of the request, and updating according to the position in the queue corresponding to the instruction, including the following two steps: 1. setting all the elements in the corresponding row to 0, which means that the request is younger than all other existing instructions. 2. Setting all the elements in the corresponding column to 1 (including valid bits), which means that other existing instructions are larger than the current instruction. Of course, the above two steps can also be executed simultaneously.

Deleting request age: setting a valid bit corresponding to the element to 0.

Specifically, at the beginning, it is determined whether the processor pipeline flushes the age matrix by receiving the preset instruction and sending the request updating information; if yes, the age matrix is reset, and the elements of the age matrix are reset to zero, and then the process is ended. If not flushing, it is determined whether to record the age information of the age matrix; if yes, the row corresponding to the age information is set to 0, and the row is correspondingly set to 1 according to the row setting, and the process is ended. If not, the age information is deleted and the corresponding valid position is set to 0.

In the embodiment, the searching module 25 is also configured for receiving a request to be queried, and generating a selection vector according to a range of the request to be queried.

Generating the selection vector is to generate a vector according to the range of the request to be queried, for example, 1 indicates selected, and 0 indicates unselected. For example, in a queue with a depth of 4, a vector required to select the $2^{nd}$ and $4^{th}$ requests is: 4'b1010.

Generating a selection mask according to a query type; wherein when the oldest request is selected, columns corresponding to the unselected request are all set to 0; and when the youngest request is selected, columns corresponding to the selected request are all set to 0. 0 is an assignment.

Generating the selection mask is to generate a mask according to the query type (youngest/oldest). When the oldest request is selected, columns corresponding to the unselected request are all set to 0. When the youngest request is selected, columns corresponding to the selected request are all set to 0.

Generating a result matrix according to the selection mask.

The information in the age matrix is processed and placed in a temporary result matrix according to the information of the selection mask to realize the generation of the result matrix.

Generating a result vector according to the result matrix.

The result vector is output according to the result matrix. When the oldest is selected, a row with all 1 in the result matrix indicates that the element is the oldest among the selected elements. For example, if the $N^{th}$ row is all 1, then the $N^{th}$ element is the oldest, wherein N represents the number. When the youngest is selected, a row with all 0 in the result matrix indicates that the element is the youngest among the selected elements.

In the embodiment, the searching module 25 is also configured to generate a sub-result matrix according to elements corresponding to the sub-queues when selecting in the sub-queues.

Specifically, when it is only required to select in the sub-queues, it is only required to generate the sub-result matrix according to the elements corresponding to the sub-queues. For example, in a four-set sub-queue structure with a total depth of 16, when only the age information of the first sub-queue needs to be queried, only a 4×4 result matrix needs to be generated instead of a 16×16 global matrix.

In the embodiment, the technical effect and principle realized by the order-preserving system 200 for the multiple sets of load store queues of the processor are the same as those realized by the order-preserving method for the multiple sets of load store queues of the processor provided in the first embodiment of the present disclosure, and will not be repeated here.

Embodiment 3

Figure 6:
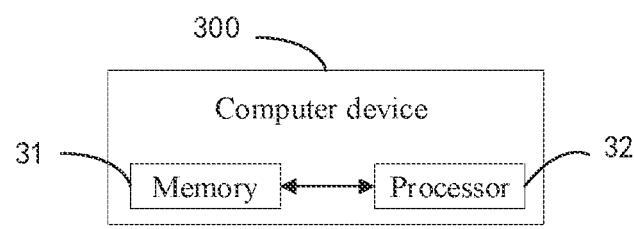
FIG. 6 is a module diagram of a computer device provided by an embodiment of the present disclosure.

As shown in FIG. 6, the embodiment of the present disclosure provides a computer device 300, wherein the computer device includes a memory 31, a processor 32, and an order-preserving program for multiple sets of load store queues of a processor stored in the memory 31 and executed by the processor 32, when the order-preserving program for the multiple sets of load store queues of the processor is executed, the processor performs the steps of the order-preserving method for the multiple sets of load store queues of the processor as described above:

Step S1: presetting a total depth of the queues; wherein the total depth of the queues includes multiple sets of sub-queues;

Step S2: determining a dimension of an age matrix according to the total depth of the queues;

Step S3: initializing the age matrix to obtain initial age information of the age matrix; wherein the initial age information includes entries of the sub-queues;

Step S4: when a preset instruction is received and enters the total depth of the queues, updating related positions of corresponding rows and columns in the age matrix according to a time order, and recording age information;

Step S5: initiating a request through the multiple sets of sub-queues, and searching for local and global age information for order-preserving operation; and Step S6: when the request is completed and released from the total depth of the queues, updating the related positions of the corresponding rows and columns in the age matrix, and deleting the age information.

The memory 31 can be used to store software programs and various data. The memory 31 can mainly include a program storage region and a data storage region, wherein the program storage region can store an operating system, at least one application required by a function (such as a sound playing function, an image playing function, etc.) and the like; the data storage region can store data created according to the use of the handset (such as audio data, telephone book, etc.) and the like. In addition, the memory 31 can include a high-speed random access memory, and can also include a non-volatile memory, such as at least one disk memory device, a flash memory device, or other volatile solid storage devices.

The processor 32 is a control center of a terminal, and uses various interfaces and lines to connect various parts of the terminal, runs or executes software programs and/or modules stored in the memory 31, and calls data stored in the memory 31 to execute various functions of the terminal and process data, thus entirely monitoring the terminal. The processor 32 may include one or more processing units. Preferably, the processor 32 may integrate an application processor and a modem processor, wherein the application processor mainly processes an operating system, a user interface, an application program, and the like, while the modem processor mainly processes wireless communications. It is to be understood that the above modem processor may not be integrated into the processor 32 either.

It should be noted that, when in use, the computer device 300 can achieve the technical effect as achieved by the above-mentioned order-preserving method for the multiple sets of load store queues of the processor. For details, please refer to the description of the above-mentioned order-preserving method for the multiple sets of load store queues of the processor, which will not be repeated here.

Embodiment 4

The embodiment of the present disclosure provides a computer readable storage medium storing an order-preserving program for multiple sets of load store queues of a processor, when executed by the processor, causes the processor to perform the steps of the above-mentioned order-preserving method for the multiple sets of load store queues of the processor.

The computer readable storage medium may be, for example, a Read-Only Memory (ROM for short), a Random Access Memory (RAM for short), a magnetic disk or an optical disk, etc.

It should be noted that the terms "including", "comprising" or any variations thereof are intended to embrace a non-exclusive inclusion, such that a process, a method, an article, or an apparatus including a series of elements, includes not only those elements but also includes other elements not expressly listed, or also includes elements inherent to such process, method, article, or apparatus. In the absence of further limitation, an element defined by the phrase "including one . . . " does not exclude the presence of additional identical element in the process, method, article, or device.

Through the description of the above embodiments, those skilled in the art can clearly understand that the method according to the above embodiments can be implemented by means of software plus a necessary general hardware platform, and of course, the method can be implemented by means of hardware, but in many cases, the former is a better implementation manner. Based on such understanding, the essence of the technical solutions of the present disclosure, or the part contributing to the existing technology, can be embodied in the form of a software product, and the computer software product is stored in a storage medium (such as a ROM/RAM, a magnetic disk and an optical disk) including a number of instructions such that a terminal device (which may be a mobile phone, a computer, a server, or a network device, etc.) performs the methods described in each of the embodiments of the present disclosure.

The foregoing descriptions are merely embodiments of the present disclosure, but are not intended to limit the patent scope of the present disclosure. All equivalent structures or equivalent flow transformations made using the description of the present disclosure and the accompanying drawings, or being used directly or indirectly in other related technical fields, are similarly included in the protection scope of the present disclosure.

What is claimed is:

1. An order-preserving method for multiple sets of load store queues of a processor, comprising:
   presetting a total depth of the queues; wherein the queues comprise multiple sets of sub-queues;
   determining a dimension of an age matrix according to the total depth of the queues;
   initializing the age matrix to obtain initial age information of the age matrix; wherein the initial age information comprises entries of the sub-queues;
   updating related positions of corresponding rows and columns in the age matrix according to a time order and recording current age information, in response to both a preset instruction being received and entering the queues; and
   initiating a request through the multiple sets of sub-queues, and searching for local and global age information for order-preserving operation,
   wherein initializing the age matrix to obtain the initial age information of the age matrix comprises:
   initializing the current age information in the age matrix in response to the age matrix being initialized and/or clearing the current age information in the age matrix in response to the age matrix being flushed by a processor pipeline;
   acquiring a size of the age matrix according to the total depth of the queues;
   dividing the age matrix according to a number of the multiple sets of sub-queues;
   initializing the age matrix; and
   obtaining a queue of the age matrix.

2. The order-preserving method for multiple sets of load store queues of a processor according to claim 1, wherein the updating comprises:
   receiving the preset instruction and sending a request updating the current age information;
   determining whether the processor pipeline is to flush the age matrix;
   in response to a determination to flush the age matrix, resetting the age matrix;
   in response to a determination to not flush the age matrix, recording the current age information;
   setting the corresponding rows according to the current age information; and
   setting the corresponding columns according to the setting of the corresponding rows.

3. The order-preserving method for multiple sets of load store queues of a processor according to claim 1, wherein initiating a request through the multiple sets of sub-queues, and searching for local and global age information for order-preserving operation, comprises the following sub-steps:
   receiving a request to be queried, and generating a selection vector according to a range of the request to be queried;
   generating a selection mask according to a query type; in response to an oldest request being selected, columns corresponding to an unselected request are all set to 0; and in response to a youngest request being selected, columns corresponding to a selected request are all set to 0; wherein 0 is an assignment;
   generating a result matrix according to the selection mask; and
   generating a result vector according to the result matrix.

4. The order-preserving method for multiple sets of load store queues of a processor according to claim 3, wherein generating a result matrix according to the selection mask comprises:
   generating a sub-result matrix according to elements corresponding to the sub-queues in response to selecting in the sub-queues.

5. The order-preserving method for multiple sets of load store queues of a processor according to claim 1, wherein after the initiating a request through the multiple sets of sub-queues, and searching for local and global age information for order-preserving operation, the method further comprises:
   in response to the request being completed and released from the queues, updating the related positions of the corresponding rows and columns in the age matrix, and deleting the current age information.

6. A computer device, wherein: (i) the computer device comprises a memory, and an order-preserving program stored in the memory; and (ii) when the order-preserving program is executed, the processor performs the steps of the order-preserving method for the multiple sets of load store queues according to claim 1.

* * * * *